June 21, 1938.  N. D. COOPER  2,121,586
MOTOR CONTROL SYSTEM
Filed Sept. 29, 1936   3 Sheets-Sheet 1

WITNESSES:

INVENTOR
Nelson D. Cooper.
BY
ATTORNEY

June 21, 1938.  N. D. COOPER  2,121,586
MOTOR CONTROL SYSTEM
Filed Sept. 29, 1936  3 Sheets-Sheet 2

WITNESSES:
C. J. Weller.
Wm. C. Groome

INVENTOR
Nelson D. Cooper.
BY
Paul E. Friedemann
ATTORNEY

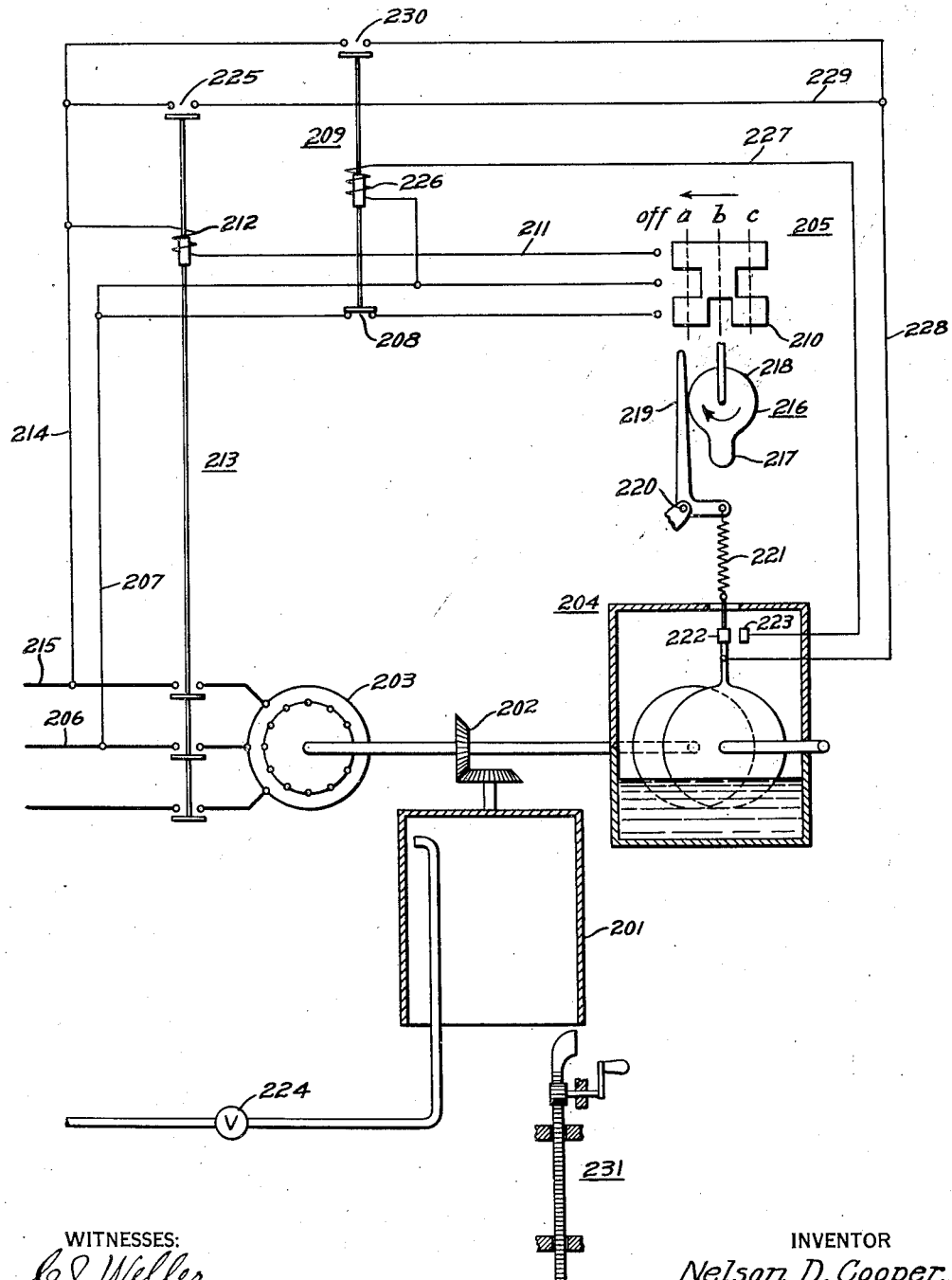

Patented June 21, 1938

2,121,586

UNITED STATES PATENT OFFICE 2,121,586

MOTOR CONTROL SYSTEM

Nelson D. Cooper, Mariemont, Cincinnati, Ohio, assignor to Westinghouse Electric & Manufacturing Company, East Pittsburgh, Pa., a corporation of Pennsylvania Application September 29, 1936, Serial No. 103,146

11 Claims. (Cl. 172—179)

My invention relates to control systems for electric motors, and more particularly to systems of control for, at will, effecting the operation of a normally high speed motor at a relatively low speed.

With the devices of the prior art, that is, control systems for electric motors, satisfactory inching, or slow speed operation, cannot be obtained. This shortcoming is especially noticeable with alternating-current motors because these motors have a tendency to synchronize.

One object of my invention is to provide for relatively slow operation of any motor though such motor may be designed for a much higher speed.

A more specific object of my invention is to provide for inching any type of electric motor without the motor attaining full speed even though the switch for inching is held in closed position.

It is also an object of my invention to provide for automatically inching a motor by merely holding the motor starting inching switch in operative position for as long as the automatic operation is to continue.

A still further object of my invention is to provide a simple and positive method of inching any type of motor, without the motor attaining full speed even though the inch push button, or other switch, for inching is held in the inch position.

Another object of my invention is to adjust the inching speed of a motor to a selected value and to automatically effect the operation of the motor at such selected inching speed.

All the foregoing objects of my invention I accomplish by the combination of a zero-speed switch, rotated by the motor to be controlled, with a starting control and inching switch for the motor.

Figure 1:
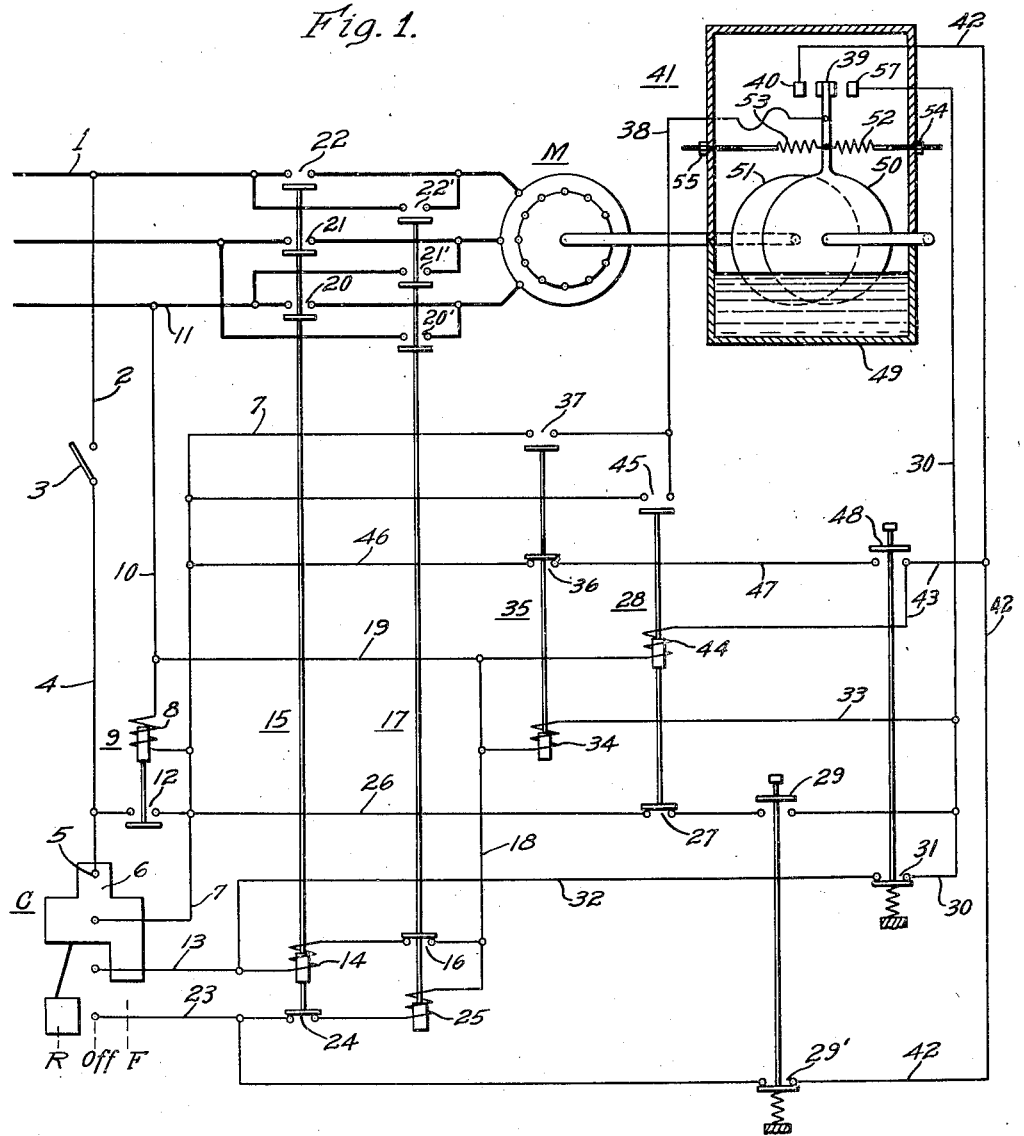
Figure 2:
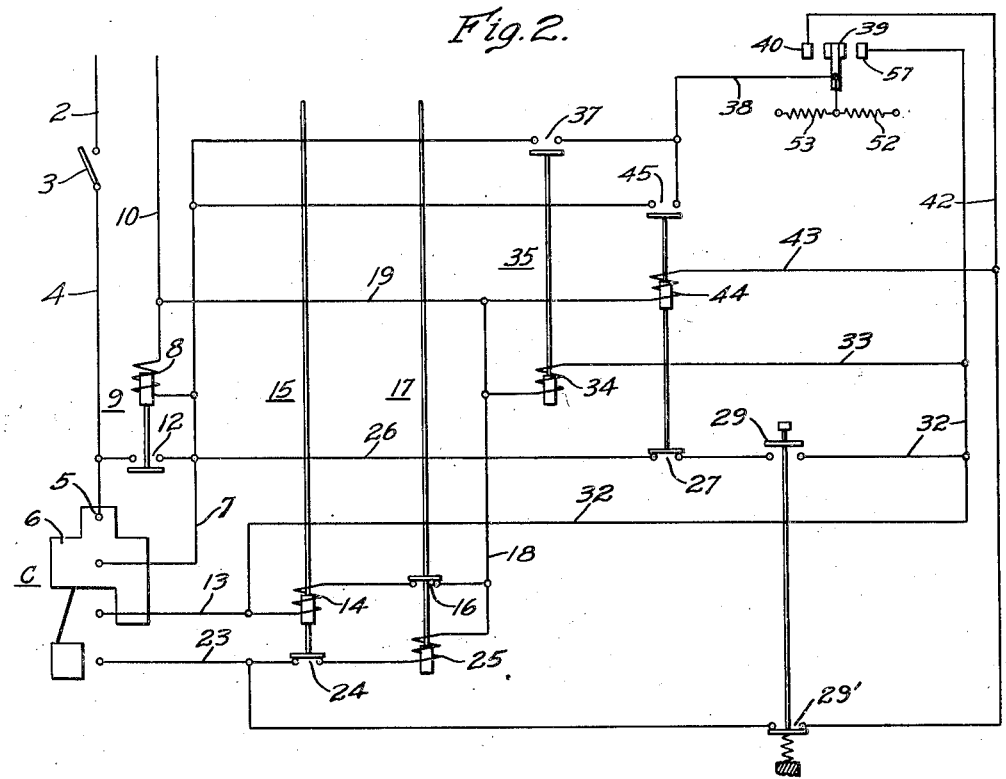
Figure 3:
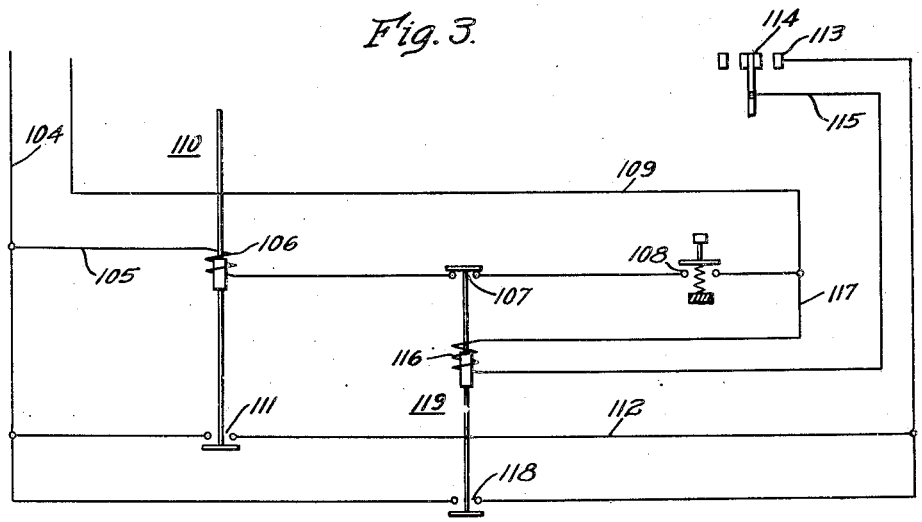

Still other objects not specifically hereinbefore recited and other advantages not mentioned will become more apparent from a study of the following specification and the accompanying drawings, in which:

Figure 1 illustrates diagrammatically my invention in combination with one type of a complete motor starting and reversing control;

Fig. 2 diagrammatically illustrates my invention in combination with a complete non-reversing starting control for a motor;

Fig. 3 is a diagrammatic showing of my invention but wherein only enough of the starting control is shown to illustrate how my invention coacts with a motor starting control system; and Fig. 4 shows diagrammatically how my invention is used in a particular application.

Referring to Fig. 1, reference character M designates a motor that is to be controlled, that is, designates a motor that normally operates at its full load speed but which must at times be operated at but a small fraction of its normal full load speed. Motors driving grinders, cutters, lathes, centrifugal extractors, slitters, registering cutters, laundry tubs, paper winders, centrifugal driers in laundries, etc., often require a temporary slow speed operation.

For example, for the control of sugar centrifugals, the bottomless tub is first rotated at a relatively slow speed while the syrup is fed into the tub. The tub is then rotated at a high speed to extract the moisture from the syrup, after which the tub must be operated at a still slower or inching speed while a gouger is inserted at the open bottom of the tub and used for gouging the sugar off of the inside walls of the extractor tub.

For a centrifugal drier, or for a laundry tub, a slow motor speed is often required for a somewhat similar purpose.

For a lathe the gears must be brought into proper position to mesh with other gears when changing speeds. To avoid danger of chipping the gear teeth, this must be done at a very low speed, and it thus becomes of value to be able to automatically maintain the motor speed at a low value for as long as is desired.

In the systems of control shown in Figs. 1, 2 and 3 of the drawings, I have not shown any load connected to the motor. This has been done for two important reasons, namely, first, to simplify and clarify the discussion, and second, because my invention is not limited to any particular load that may be connected to the motor.

The motor M operates, in addition to the load not shown, a zero speed switch 41. For normal speed operation controller C is used which controller selects the operation of either the directional contactor 15 or the directional contactor 17 to thus select the direction of operation of the machine coupled to the motor.

For the slow speed operation, that is, for the inching speed, inching push button switches 29 or 48 are used. The zero speed switch 41 and the control relays 28 and 35 coact with the push button switches to automatically effect an inching speed for the motor M.

A still better understanding of my invention can probably be had from a study of typical sequences of operation of my invention with typical motor control systems. Assuming that the attendant is operating a lathe and must shift gears, it may be necessary to move one gear slowly with respect to the mating gear so that their teeth will slide into mesh, that is, he has to inch the motor. He closes the switch 3 to energize the control system. Closure of switch 3 establishes a circuit from energized conductor 1 through conductor 2, switch 3, conductor 4, contact fingers 5 of controller C, bridged by the segment 6, conductor 7, actuating coil 8 of low voltage protection relay 9, and conductor 10 to the energized conductor 11. Operation of relay 9 closes contact members 12 whereby a holding circuit is established for coil 8.

Since the controller C is in the "Off" position, the motor M cannot be energized except through operation of the inch push button switches 29 or 48. If the attendant wishes to inch the motor in the forward direction, he actuates switch 29, whereupon a circuit is established from energized conductor 7, through conductor 26, contact members 27 of control relay 28, forward inch push button switch 29, conductor 30, back contact members 31 of the reverse inch push button switch 48, conductor 32, actuating coil 14 of forward directional contactor 15, back contact members 16 of reverse directional contactor 17, conductors 18 and 19 to the energized conductor 10. Another circuit is also established by the operation of switch 29. This circuit may be traced from energized conductor 30 through conductor 33, the actuating coil 34 of control relay 35 to the energized conductor 19. The operation of switch 29 also causes the opening of switch 29' to thus eliminate the possibility of reverse operation of the motor through inadvertent operation of the reverse directional contactor 17.

From the circuits traced it is apparent that forward directional contactor 15 operates to close contact members 20, 21 and 22, and causes the opening of switch 24 at the same time the operation of the control relay 35 causes the opening of contact members or switch, 36, and the closing of contact members, or switch, 37. The opening of switch 36 prevents the closing of circuits for reverse inching whereas the closing of switch 37 puts potential on one of the terminals, namely, terminal 39, of the zero speed switch 41.

As the motor accelerates and while still at a rather low speed, terminal 39 is moved over to the left to contact with terminal 40. With the engagement of these terminals, an energizing circuit is established from energized conductor 7, through contact members 37, conductor 38, terminals 39 and 40 of the zero speed switch 41, conductors 42 and 43, actuating coil 44 of control relay 28 to the energized conductor 19.

Energization of coil 44 causes the opening of the circuit for the coil 14 of the directional contactor 15 at the contact members 27. The motor is thus disconnected from the source of energy and begins to slow down. Coil 34 of control relay 35 will also be deenergized but since contact members 45 are closed by the operation of control relay 28, the potential will not be removed from terminal 39.

As soon as the speed of the motor has decreased a given amount, terminals 39 and 40 are separated, with the result that coil 44 becomes deenergized, and in consequence, contact members 27 close and contact members 45 open. The directional contactor 15 is reenergized by reason of the closure of contact members 27 and for the same reason control relay 35 operates again. The motor thus again increases in speed. This cycle of operation is repeated as long as switch 29 is held closed. The length of time the motor is connected to the source of energy is dependent on the adjustment of the tension of the springs 52 and 53 which tension may be adjusted by the screws 54 and 55.

Briefly, the zero speed switch 41 comprises a housing containing an oil of suitable viscosity. A disc 51 is driven by the motor M and another disc, as 50, is mounted on suitable bearings in the housing and is acted upon by the viscosity of the oil. The rotation of disc 51 thus tends to carry disc 50 along except when the motor is at zero speed. The terminal 39, mounted on disc 50 thus remains in the position shown except when motor M is rotating. The force with which the terminal 39 is held in the zero speed position is a function of the tension of springs 52 and 53. Since the tension of these springs may be adjusted the inching speed may be adjusted. If the springs are at low tension and the contacts, or terminals, 39, 40 and 57 properly spaced a very low inching speed may be secured whereas if the tension of the springs is high, the inching speed will be higher.

If the attendant wishes to inch in the reverse direction, he actuates push-button switch 48. Operation of the push button switch 48 establishes a circuit from the energized conductor 7 through conductor 46, back contact members 36 of control relay 35, conductor 47, push button switch 48, conductor 42, back contact member 29' of the forward inching switch 29, back contact member 24 of the forward directional contactor 15, actuating coil 25 of the reverse directional contactor 17 and conductors 18 and 19 to the energized conductor 10. Another circuit is also established from the energized conductor 46 through the back contact members 36, conductor 47, push button switch 48, conductor 43, actuating coil 44 of the control relay 28 to the energized conductor 19. The directional contactor 17 closes the contact members 20', 21' and 22' to cause the motor M to operate in a reverse direction, whereas the energization of the coil 44 causes the opening of contact members 27 to thus prevent energization of the forward directional contactor 15 and causes the closing of the contact members 45 to thus subject the movable terminal 39 of the zero speed switch 41 to a potential.

As soon as the motor M has attained a predetermined speed in a reverse direction, the disc 50 will be actuated in a clockwise direction, therefore, causing the terminals 39 and 57 to engage, whereupon a circuit is established from the energized conductor 7 through contact members 45, conductor 38, terminals 39 and 57, conductors 30 and 33, actuating coil 34 to the energized conductor 19. As the control relay 35 operates by reason of the energization of its coil 34, the circuit for the reverse directional contactor is broken at contact members 36 and the motor begins to decrease in speed. Since the contact members 37 are, however, closed, the potential is maintained on terminal 39 even though the opening of contact members 36 also deenergizes the actuating coil 44 of the control relay 28.

As soon as the speed of the motor has dropped to a low value which may be substantially zero speed, the terminals 39 and 57 are disengaged, whereupon the coil 34 is deenergized and in consequence the reverse directional contactor is again energized by reason of the closure of the contact member 36. This cycle is repeated again and again as long as the reverse inching push button 48 is held in the closed position. The inching speed will be determined by the adjustment of the springs 52 and 53.

To show a specific application of my invention, I have illustrated my automatic inching control in Fig. 4 in conjunction with the operating mechanisms of an extractor in a sugar mill.

An extractor of this type, as has already been mentioned, comprises a bottomless tub 201 operated by a motor 203, the speed of which is to be controlled. During the loading operation, the syrup from which the moisture is to be extracted is fed into the bottomless tub from a suitable reservoir while the tub is operating at a speed just sufficiently high to retain the syrup on the walls of the tub but nevertheless considerably lower than the full load or extracting speed of the tub. After the loading, the speed is increased to normal value to extract the moisture from the syrup. When the moisture has been extracted, the speed is decreased to a very low speed so that a suitable gouging mechanism can be inserted in the tub from the bottom to dislocate the sugar coating disposed on the walls of the extractor tub. The operating cycle may be at speeds, which are more or less representative, of a loading speed of 300 revolutions per minute, an extracting speed of 1200 revolutions per minute and an unloading speed of 50 revolutions per minute.

In Fig. 4, reference character 201 designates the extractor tub which, through suitable gearing as 202, is driven by motor 203. Since there is no need for reversing this motor, I have not shown a reversing type of control. This motor 203 is also coupled to the zero speed switch 204 and is controlled for its three speeds by the controller 205. Assuming that the attendant wishes to load the extractor, he operates the controller 205 from the "off" position to the position "a" whereupon a circuit is established from the bus 206 through conductor 207, back contact members 208 of the control relay 209, controller segment 210, conductor 211, actuating coil 212 of the main switch 213 and conductor 214 to the bus 215. The controller, which is shown somewhat distorted for purposes of clarity, has a cam 216 on its shaft provided with a raised portion 217 and a circular portion 218 disposed over a greater part of its circumference. This cam coacts with the lever 219 pivoted at 220 and varies the tension of spring 221 of the zero speed switch 204. For the "a" position the cam will be turned a quarter of a turn, and in consequence the raised portion 217 will move the lever 219 through a maximum angle, therefore, subjecting the spring 221 to its maximum tension. The movable contact member 222 of the zero speed switch will thus only be moved to engage the stationary member 223 when the motor has attained a trifle over 300 revolutions per minute. The motor will thus accelerate to a little over 300 revolutions per minute whereupon the attendant opens valve 224 to thus discharge the syrup against the inside wall of the tub 201.

It should be noted that the operation of the main switch 213 closes the contact members 225, thereby subjecting the movable contact member 222 of the zero speed switch to a potential. As soon as the motor speed has attained a speed a little over 300 revolutions per minute, the terminals or contact members 222 and 223 are engaged, whereupon a circuit is established from energized conductor 207 through the actuating coil 226 of control relay 209, conductor 227, terminals 223 and 222, and conductors 228 and 229 and contact members 225 to the energized conductor 214. The control relay 209 is thus operated and effects the opening of the energizing circuit for the main contactor by reason of the opening of the contact members 208. Potential is, however, maintained on the movable terminal 222 by reason of the closure of contact members 230.

The motor being disconnected from the source of supply decreases in speed and when it has attained a speed somewhat below 300 revolutions per minute the terminals 222 and 223 are disengaged, whereupon the control relay 209 is de-energized and main switch 213 is again energized by reason of the closure of contact members 208.

As soon as the loading has been completed, the attendant closes valve 224 and moves the controller to the "b" position, whereupon the main switch 213 is energized by a circuit in parallel to the contact members 208. The zero speed switch, therefore, can have no further effect upon the main switch 213.

As soon as the moisture has been extracted from the syrup, the controller is moved to the c position which comprises a three-quarter turn of the cam 216 with the result that the lever 219 is in the position shown and in consequence the tension on spring 221 is rather low. In the c position, the zero speed switch again assumes control of the main switch 213, since the circuit in shunt relation to contact members 208 no longer exists. In consequence, the motor speed drops down to about 50 revolutions per minute. The gouging mechanism 231 is thus actuated to remove the sugar from the tub 201 while the zero speed switch 204 maintains the speed of the motor at about 50 revolutions per minute in exactly the same manner as it did for the 300 revolutions per minute, the only difference being the adjustment of the force necessary to cause movable contact member 222 to move.

In some instances, one zero speed switch may not have a range of adjustment corresponding to the range of inching speed desired. In such cases the circuit arrangement may be such that two zero speed switches may be used, namely, one for the lower inching speed and one for the higher inching speed. Each of these switches will, of course, be designed for a particular speed and each switch may have means for adjusting the range of its control action. It goes without saying that the particular switch not in use at a given time should be shunted out. In a sense, the switch 204 shown in Fig. 4, functions like two switches, namely, when the cam 216 is in one position, one inching speed may be obtained whereas when the cam 216 is in another position, the characteristics of switch 204 are so changed that another inching speed may be obtained.

When the sugar has been removed, the gouging mechanism is moved to the position shown and the cycle can be repeated by moving the controller to the "off" position and then successively to the a, b and c positions.

It might be desirable to point out how the system of control, when not using my contribution, functions, when it is not necessary or desirable to operate the motor M at an inching speed.

If the controller C, referring to Fig. 1, be moved from the "off" position to the F or forward position, a circuit is established from the energized controller segment through conductor 13, actuating coil 14 of the forward directional contactor 15, back contact members 16 and conductors 18, 19 and 10 to the energized bus 11. The motor is thus set into operation in the forward direction, and while it does during its operation influence the position of the contact 39 of the zero speed switch, the change of position of this contact member or terminal is not important, since, for full speed operation, both the inching push button switches 29 and 48 are in the open circuit position, namely, the position shown, so that no controlling effect is produced by the zero speed switch 41.

For reverse operation, the controller C is merely moved to the R position or reverse position and the reverse directional contactor 17 is energized by the circuit which may be traced from the energized controller segment 6 through conductor 23, back contact members 24, actuating coil 25 to the energized conductor 18.

The showing in Fig. 2, as will be apparent from the reference characters, is in a sense only a part of the subject matter shown in Fig. 1. For some applications, inching operation is not needed for both directions of operation of the motor and the control is, therefore, simplified if but one inching control is provided. It will be noted that the inching push button switch 48 is not shown. To accomplish the inching control in but one direction, the connections need to be slightly rearranged as shown.

For some applications, a reversing motor is not even needed and obviously if inching is needed, such inching will be only in the direction for which the motor is connected. This is indicated in Fig. 3. A brief analysis of the sequence of operation will show how this system of control functions. Reference numeral 110 indicates the contactor for the motor, namely, the switch for connecting the motor not shown to the line. Assuming that buses 104 and 109 are energized and the attendant wishes to start the operation, he actuates the starting switch 108 whereupon a circuit is established from bus 104 through conductor 105, actuating coil 106 of the motor contactor, back contact members 107 of a control relay 119, the starting switch 108 to the other energized bus 109.

Operation of the motor contactor 110, in addition, to connecting the motor to the line, operates the contact members 111 whereby a potential is placed on the terminal 113 through the contact members 111 and conductor 112. If the motor has accelerated to a small speed but still an inching speed, the zero speed switch will actuate the contact member 114 to engage the terminal 113 whereupon a circuit is established from the energized terminal 113 through the contact member 114, conductor 115, actuating coil 116 of the control relay and conductor 117 to the energized conductor or bus 109. Operation of the control relay 119 causes the opening of contact members 107 to thus disconnect the motor from its source of energy through the deenergization of the motor contactor 110. The energization of the actuating coil 116 of the control relay 119 also causes the closing of contact members 118, which simply means that the terminal 113 remains energized independent of the position of the motor contactor 110. However, as soon as the motor has decreased or has attained substantially zero speed the circuit made at the contact members 113 and 114 is broken, and the motor is reenergized. From the foregoing explanation, it will be apparent that Fig. 3 shows the inching control minus any other control that may be used with a motor.

I am, of course, aware that others, particularly after having had the benefit of the teaching of my invention, may devise other circuit diagrams for accomplishing substantially the same results, and it is, therefore, my intent that this invention be not limited to the specific showings hereinbefore made, but be limited only by the scope of the appended claims and such pertinent prior art as may be in existence.

I claim as my invention:

1. In a system of control for an electric motor, the combination of, a source of electrical energy, a motor, means for connecting the motor to said source of energy, and manually operable means and speed responsive means coupled to the motor to thus be responsive to the motor speed, both adapted to selectively control the means for connecting the motor to said source of energy.

2. In a system of control for an electric motor, the combination of, a source of electrical energy, a motor, switching means for connecting the motor to said source of energy, manually operable means for controlling said switching means, a speed responsive switch connected to the motor to thus be responsive to the motor speed, said speed responsive switch being connected to control said switching means, and means for selectively interconnecting said switching means with said manually operable means and said speed responsive switch.

3. A system of control for an electric motor, in combination, a source of electrical energy, a motor, a zero-speed switch, having contact terminals, coupled to the motor and adapted to bring a pair of said contact terminals into engagement when the motor speed is above a predetermined value, switching means adapted to connect the motor to said source of energy, and means adapted to be energized when a pair of said terminals of said zero speed switch are in engagement, said last named means being adapted to deenergize the switching means whereby the motor is disconnected from the source of energy.

4. A system of control for an electric motor, in combination, a source of electrical energy, a motor, a zero-speed switch, having contact terminals, coupled to the motor and adapted to bring a pair of said contact terminals into engagement when the motor speed is above a predetermined value, switching means adapted to connect the motor to said source of energy, means adapted to be energized when a pair of said terminals of said zero-speed switch are in engagement, said last named means being adapted to deenergize the switching means whereby the motor is disconnected from the source of energy, and means responsive to the disconnection of the motor from said source of energy adapted to reenergize said switching means.

5. A system of control for an electric motor, in combination, a reversible motor, a source of electrical energy, a pair of switching means, when either is energized, adapted to selectively connect the motor to said source of energy for either direction of rotation, and speed-responsive means, connected to the motor to thus be responsive to a predetermined motor speed, adapted to deenergize the energized means of the said pair of switching means.

6. A system of control for an electric motor, in combination, a reversible motor, a source of electrical energy, a pair of switching means, when either is energized, adapted to selectively connect the motor to said source of energy for either direction of rotation, speed-responsive means connected to the motor to thus be responsive to a predetermined motor speed, adapted to deenergize the energized means of the said pair of means, and manually operable means coacting with said speed responsive means adapted, when operated to effect automatic reenergization of the particular switching means deenergized by said speed-responsive means.

7. A system of control for an electric motor, in combination, a motor, a source of electrical energy, a controller adapted to connect the motor to said source of electrical energy for full speed operation when said controller is in any position other than the neutral, or "off", position, a manually operable switch adapted to cause the connection of the motor to said source of electrical energy when the controller is in the "off" position, and means responsive to a predetermined speed of the motor adapted to disconnect the motor from said source of electrical energy.

8. A system of control for an electric motor, in combination, a motor, a source of electrical energy, a controller adapted to connect the motor to said source of electrical energy for full speed operation when said controller is in any position other than the neutral, or "off" position, a manually operable switch adapted to cause the connection of the motor to said source of electrical energy when the controller is in the "off" position, means responsive to a predetermined speed of the motor adapted to disconnect the motor from said source of electrical energy, and means for automatically reconnecting the motor to the source of electrical energy when the motor speed has dropped to a predetermined low value, provided the manually operable switch is still in the actuated position when the motor speed has dropped to said predetermined low value.

9. A system of control for an electric motor, in combination, a motor, a source of electrical energy, a controller adapted to connect the motor to the source of electrical energy for full speed operation when said controller is in any position other than the neutral, or "off", position, a manually operable switch adapted to cause the connection of the motor to said source of electrical energy when the controller is in the "off" position, means responsive to a predetermined speed of the motor adapted to disconnect the motor from said source of electrical energy, means for automatically reconnecting the motor to said source of electrical energy when the motor speed has dropped to a predetermined low value, provided the manually operable switch is still in the actuated position when the motor speed has dropped to said predetermined low value, and means for adjusting the operating characteristics of the means responsive to the motor speed whereby the time interval between the connection of the motor to the source of energy and the disconnection from the source of energy may be adjusted.

10. In a system of control for an electric motor, in combination, a motor, a source of electrical energy, switching means for connecting the motor to said source of energy, speed responsive means adapted to intermittently effect the operation of said switching means, adjusting means adapted to adjust the operating characteristics of the speed responsive means so that the period during which said switching is closed during its intermittent operation may be changed to thus vary the average speed of the motor, and a controller adapted for one position to operate the adjusting means to effect the operation of the motor through the control of said speed responsive means for one motor speed range and in a second position to effect the operation of the motor independent of the speed responsive means and for a third position to operate the adjusting means to effect the operation of the motor through the control of said speed responsive means for another motor speed range.

11. In a system of control for an electric motor, in combination, a source of electrical energy, a motor, a contactor, a controller adapted to effect the connection of the motor to said source of electrical energy through operation of said contactor when in one of its operating positions, a manually operable switch adapted to cause the operation of the contactor when said controller is in a non-operating position, a control relay, when energized to operate, adapted to deenergize said contactor, and a speed responsive switch, coupled to the motor and operable at a predetermined speed of the motor adapted to energize said control relay.

NELSON D. COOPER.